Patented Apr. 14, 1925.

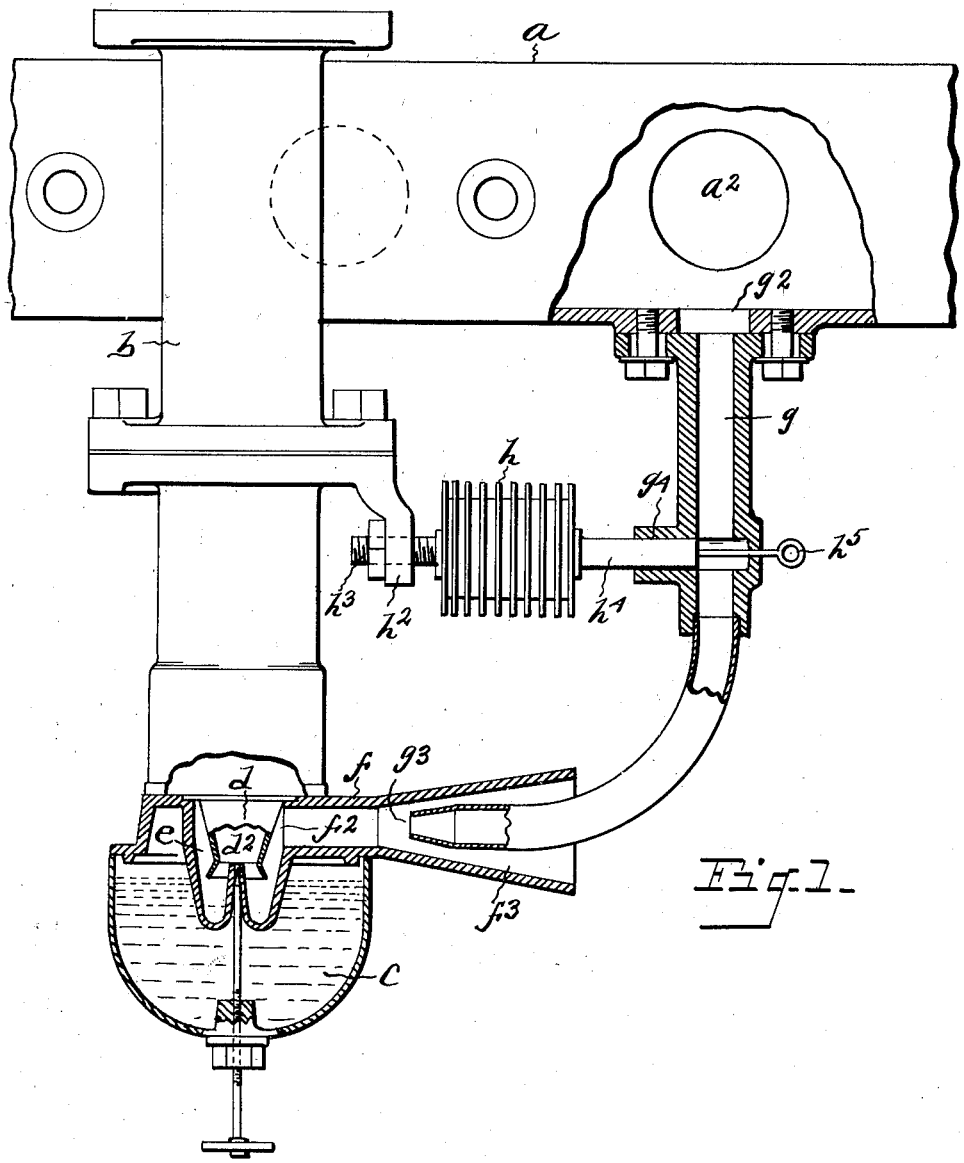

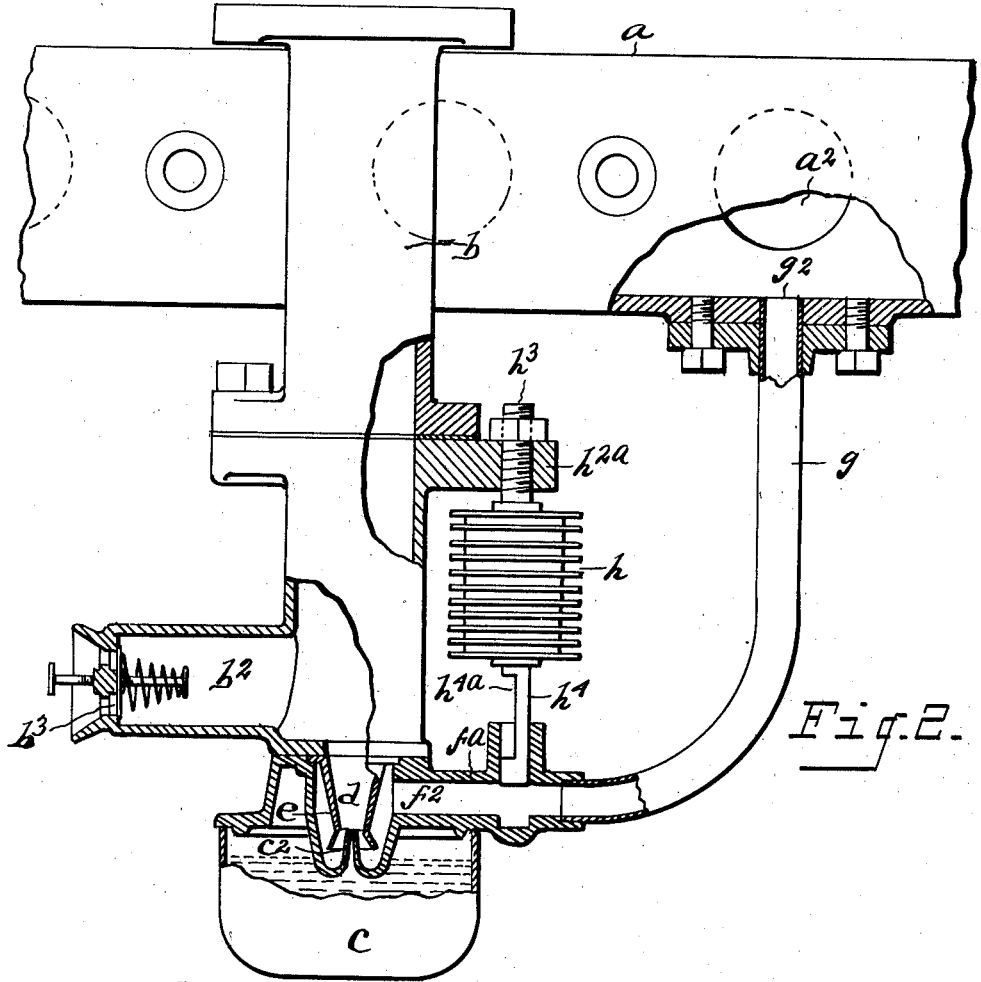
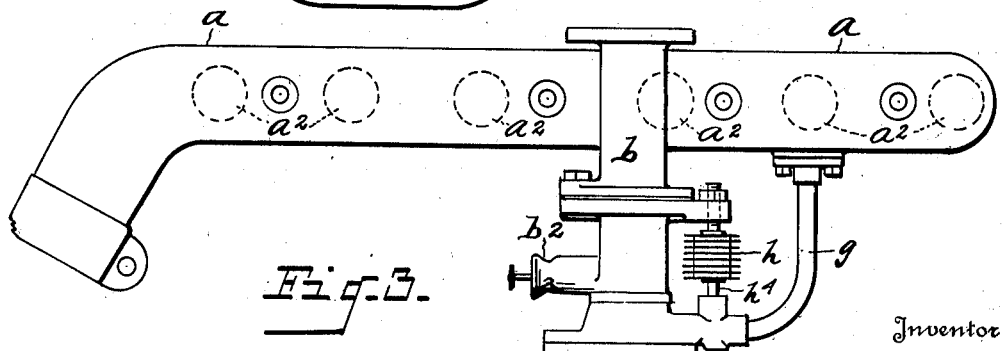

1,533,775

UNITED STATES PATENT OFFICE.

HORACE T. THOMAS, OF LANSING, MICHIGAN.

CHARGE-FORMING DEVICE FOR INTERNAL-COMBUSTION ENGINES.

Application filed June 22, 1920. Serial No. 390,762.

*To all whom it may concern:*

Be it known that I, HORACE T. THOMAS, a citizen of the United States, residing at Lansing, county of Ingham, State of Michigan, have invented a certain new and useful Improvement in Charge-Forming Devices for Internal-Combustion Engines, and declare the following to be a full, clear, and exact description of the same, such as will enable others skilled in the art to which it pertains to make and use the same, reference being had to the accompanying drawings, which form a part of this specification.

My invention relates to a charge-forming device for an internal combustion engine and an object of my improvements is to provide for more complete vaporization of the fuel and uniformity of the mixture.

I secure this object in the device illustrated in the accompanying drawings, in which—

Figure 1 is an elevation, partly in section, of an apparatus embodying my invention and so much of an internal combustion engine as is necessary to illustrate its connection therewith.

Fig. 2 is a modified form of the construction of Fig. 1.

Fig. 3 is an elevation of the complete manifold of an internal combustion engine, the intake pipe and an apparatus embodying my invention connected therewith.

$a$ indicates the exhaust manifold and $b$ the intake pipe or passage. $c$ is a carbureter-construction located at, and closing the lower or entrance end of, the passage $b$. $e$ is a chamber formed in the carbureter $c$, having its upper end open except as hereinafter described and its lower end closed except for the spraying jet nozzle $c^2$ which opens from the body, or reservoir, of the carbureter $c$ into the chamber $e$. $d$ is a tube provided with a circular flange at its upper end contracted at $d^2$ near its lower end, and from thence gradually expanding to the chamber $e$. The tube $d$ gradually expands upwardly from the contraction $d^2$ to its open upper end. The nozzle $c^2$ has its open or delivery end at the center of the contracted part $d^2$ of the tube $d$. Thus the tube $d$ forms a Venturi tube closing the upper end of the chamber $e$ and forming the delivery passage from said chamber to the interior of the passage $b$.

$f$ is a laterally-extending passage opening at $f^2$ to the chamber $e$, extending to the outer surface of the carbureter $c$, then extending beyond said outer surface in a gradually expanding portion $f^3$.

$g$ is a pipe or passage opening at $g^2$ to the interior of the exhaust manifold $a$ and extending therefrom to a contracted delivery end $g^3$ co-axial with the passage $f$ and located near the inner end of the gradually expanding portion of said passage.

$h$ is an expansible thermostatic chamber adjustably secured to a stationary lug $h^2$ by a screw-threaded shank $h^3$ and provided with a slide rod or valve $h^4$ fitting and adapted to reciprocate in a lateral passage $g^4$ in the tube or passage $g$. $h^5$ is a handle extending axially from the slide rod $h^4$ and thru the opposite wall of the passage $g$ and adapted to be manipulated to vary the position of the rod $h^4$.

The operation of the above-described apparatus is as follows:

When the engine is in operation the hot exhaust gases are projected from the manifold $h$ thru the passage $g$ into the lateral passage $f$ and thru the latter into the chamber $e$ from whence they pass thru the tube $d$, spraying and vaporizing the liquid fuel delivered from the nozzle $c^2$ and the heat of said gases assisting the vaporization of the sprayed liquid fuel. The hot exhaust gas projected thru the passage $f$ carries with it atmospheric air drawn in thru the expanded mouth $f^3$ of the passage $f$.

By this construction the charge is forced in by the action of the jet from the passage $g$, as well as drawn in by the action of the engine, and a fuller charge is obtained. The fuel is very completely atomized and is vaporized by the heat from the exhaust gases.

When the parts become highly heated the expansible thermostatic chamber $h$ receives the heat, its volatile liquid being vaporized, forcing the rod $h^4$ along with the end of said chamber and closing the passageway thru the passage $g$ in proportion to the amount of such heating. This diminishes the delivery of the exhaust gases. If it is desired to close, or partly close, the passageway thru $g$ at will, the rod $h^4$ may be drawn into said passageway by the handle $h^1$.

In the form shown in Fig. 2, the passage $f$ opening to the outer air is replaced by a passage $f^a$ the outer end of which fits tight against the end of the passage g. The slidable rod $h^4$ is cut away at its side at $h^{4a}$ so that when it is first actuated it tends to close the passageway thru g and when further actuated provides a passage thru the cut-away portion $h^{4a}$ from the outer air to supply an auxiliary quantity of air.

In the modification of Fig. 2, I show an air supply laterally extending passage $b^4$ having an automatic, inwardly opening valve $b^3$ at its outer end. If sufficient gaseous material is not supplied from the chamber thru the opening $f^2$, the valve $b^3$ is drawn from its seat by the suction of the engine and the required quantity of atmospheric air is drawn thru the passage, $b^2$.

In the form of construction shown in Fig. 2 I have placed the thermostatic chamber h beside of and close to the passage b so that its temperature shall more nearly correspond to the temperature of the passage b. Of course the thermostatic chamber h may be located at other places.

In the form of my device shown in Fig. 2, the hot exhaust gases very completely vaporize the liquid fuel and the incoming air by the passage $b^2$ readily absorbs such completely vaporized fuel into its mass.

In both modifications the intake passage is connected with the exhaust passage so that a considerable amount of the first charges supplied to the engines shall be drawn from said exhaust passage, that is to say, the intake is at first connected to the exhaust passage by a substantially closed conduit.

What I claim is:

1. In a charge forming device for internal combustion engines, the combination with an intake passage of means for supplying hot exhaust gases to said passage and mingling them with the air therein, said exhaust gases being projected in a jet through an injector tube whereby atmospheric air is drawn and forced into said intake passage and a thermostatic means for regulating said jet of exhaust gases the supply of said gases being interrupted after the engine is started.

2. In a charge forming device for internal combustion engines, the combination with an intake passage of means for supplying hot exhaust gases to said passage and mingling them with the air therein, said exhaust gases being projected in a jet through an injector tube whereby atmospheric air is drawn and forced into said intake passage and a thermostatic means for regulating said jet of exhaust gases, said thermostatic means being associated with the wall of the intake passage so as to be effected by the temperature of said wall the supply of said gases being interrupted after the engine is started.

3. In a charge forming device for internal combustion engines, the combination of an intake passage, a delivery jet for delivering fuel in said passage, an exhaust conduit, a passage leading from said exhaust conduit to the opening to the intake passage, means for controlling the flow of exhaust gases to the intake pipe, and a thermostat governing said controlling means, said controlling means being arranged to interrupt the flow of said gases after the engine is started.

4. In a charge forming device for internal combustion engines, the combination of an intake passage, a delivery jet for delivering fuel in said passage, an exhaust conduit, a passage leading from said exhaust conduit to the opening to the intake passage, means for controlling the flow of exhaust gases to the intake pipe, and a thermostat governing said controlling means, said thermostat being associated with the intake passage so as to be operated by the heat from said passage, said controlling means being arranged to interrupt the flow of said gases after the engine is started.

5. In combination with an internal combustion engine having an intake passage, means for delivering liquid fuel into said passage, and an exhaust passage, means for putting said intake passage into connection with said exhaust passage when the engine is starting, and automatic means for interrupting the connection between said intake and exhaust passage after the engine is started.

6. In a charge forming device for internal combustion engines, the combination with an intake passage, of means for delivering liquid fuel in said passage, a source of supply of hot gases under pressure communicating with said intake passage at a point remote from the engine with relation to the point of delivery of liquid fuel, and a thermostatically controlled device for regulating the flow of hot gases to the intake passage arranged to interrupt said flow after the engine is started.

7. In a charge forming device for internal combustion engines, the combination with an intake passage having a throttle valve, of means for delivering liquid fuel in said passage, a source of supply of hot gases under pressure communicating with said intake passage at a point remote from the engine with relation to the point of delivery of liquid fuel, and a thermostatically controlled device for regulating the flow of hot gases to the intake passage when said throttle valve is open, and means for mingling said hot gases with the air entering said passage.

In testimony whereof, I sign this specification.

HORACE T. THOMAS.